Feb. 5, 1935.   W. A. SONNETT   1,990,353
INFLATABLE GAME BALL
Filed March 21, 1930

INVENTOR.
William A. Sonnett
BY
Allen & Allen
ATTORNEY.

Patented Feb. 5, 1935

1,990,353

UNITED STATES PATENT OFFICE 1,990,353

INFLATABLE GAME BALL

William A. Sonnett, Cincinnati, Ohio, assignor to The P. Goldsmith Sons Company, Cincinnati, Ohio, a corporation of Ohio Application March 21, 1930, Serial No. 437,723

4 Claims. (Cl. 273—65)

My invention refers to inflatable game balls such as footballs, basketballs, volley balls and the like which have an outer cover, usually of leather, and an inner inflatable member, usually called a bladder, which has a valve which is positioned relative to a hole in the cover so that the ball may be inflated by inserting the discharge valve of a pump into the opening in the cover.

It is the object of my invention to provide a retaining nut retained within a resilient cushion-like member which may be secured on the inner surface of the cover so that the valve of the bladder may be simply and readily secured in inflating position in the nut.

Another object of my invention is the provision of a valve supporting cushioning member which will avoid the formation of a flat or dead spot or area on the cover surrounding the inflating opening so that the ball will always bounce true regardless of the portion which strikes the surface on which the ball is bounced.

Another object is the provision of a cushioning member composed preferably of rubber so that it may be cemented or secured by stitching with fabric with which it is vulcanized against the inner surface of the cover thereby avoiding the necessity of metallic plates for securing same in position. The avoidance of metal plates or members prevents the formation of flat or dead spots or areas.

A still further object of my invention is the provision of a cushioning member having a threaded member molded within its structure so that the nut will be held permanently in place. Further it is my object to so form the cushioning member that the nut will not bear directly against the cover, and also preferably having an annular shoulder which will locate the cushioning member with respect to the hole in the cover.

Another object is to provide the cushioning member with means for receiving and retaining a plug to prevent displacement of the valve.

The above objects and other objects to which reference will be made in the ensuing disclosure, I accomplish by that certain combination and arrangement of parts of which I have shown a preferred modification.

Referring to the drawing:—

Figure 1:
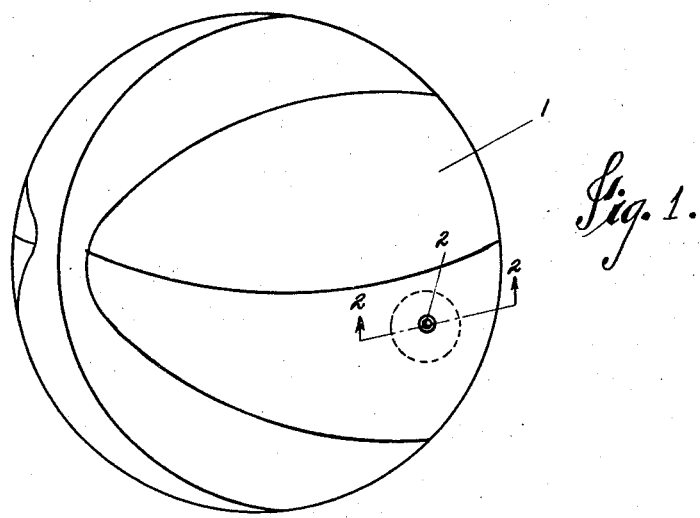
Figure 1 is a perspective view of an inflatable ball in which my invention is employed.
Figure 2:
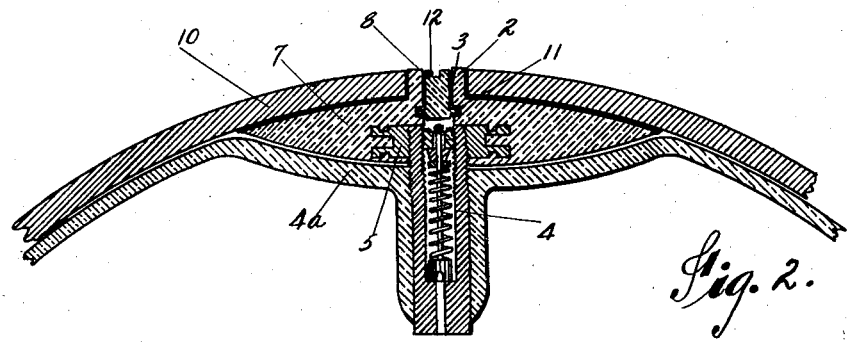
Figure 2 is a sectional view of the ball taken along the lines 2—2 in Figure 1.
Figure 4:
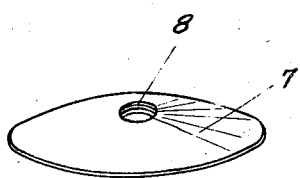
Figure 4 is a sectional view of a modified type of cushioning member.
Figure 3:
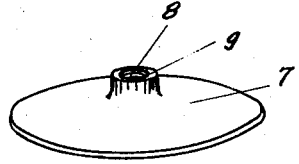
Figure 3 is a sectional view of a preferred type of cushioning and positioning member.
Figure 5:
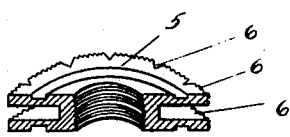
Figure 5 is a detail section of a preferred type of nut.

Generally indicated at 1 I have shown the outer cover of the ball which, as has been noted, is provided with a hole 2 through which an inflating tool may be inserted which engages the internal threads 3 of the valve stem 4. The valve stem 4 is cemented or vulcanized in an aperture in the bladder 4a. The tubular shell of the valve is externally threaded and extends about three-sixteenths of an inch above the surface of the bladder.

I provide a nut 5 having roughened and fluted indentations. The nut is molded or vulcanized within the body of a pad member 7 close to the inner surface thereof. The pad is preferably composed of rubber, and tapers from its central part down to a thin section at its periphery. The pad may also be vulcanized with suitable fabric to permit of its being stitched in position. The pad, as indicated, has a hole 8 passing through it which registers with the hole extending through the nut. It should be noted that the nut is spaced from the upper surface of the pad so that the material in the pad prevents the nut from bearing directly against the inner surface of the cover. This prevents the formation of a dead spot in the cover in the area thereof surrounding the inflating aperture.

The preferred type of pad has an integrally formed annular shoulder 9 which fits within the hole in the cover so that proper registry of the hole in the nut with the hole in the cover is insured. The pad is preferably secured in position by cementing with a layer of cement indicated at 10.

The periphery of the passage 8 may be provided with a slot 11 for retaining the lugs on a plug 12 which may be used to prevent the inadvertent unseating of the valve stem or threads.

If the ball has a laced opening the bladder is inserted through the opening and the exterior threads of the valve stem are threaded into the nut. The lacing is then secured and by inserting an exteriorly threaded tip of an inflating tool into the interior threads of the nut preferably, or into the interior threads of the valve stem, the ball may be inflated to a desired pressure.

Having thus described my invention, what I claim as new and desire to secure by Letters Patent, is:—

1. An inflatable ball comprising a cover having an inflation opening therein and a bladder having an inflation stem protruding beyond the walls thereof, a resilient disc, said protruding end of said stem secured within said disc, means extending beyond the surface of said disc into the inflation opening in the cover to insure registry of the axis of said stem and of the opening in the cover, and adhesive securing said disc in position against the inner surface of said cover.

2. In an inflatable game ball, a cover with an inflation opening therein, a soft elastic cushion member secured to the interior wall of the cover solely by adhesive and having an integral soft cushioning hollow neck extending into the cover opening to reinforce its adhesive connection to the cover against strains tending to laterally displace said cushion member, a connection element of hard material completely enclosed and secured in said soft elastic cushion member with an opening alined with the cushion member neck, and a bladder having an inflation stem retentively held in the opening of said connection element.

3. In an inflatable ball comprising a cover having an inflation opening therein and a bladder, a resilient disc between the exterior of the bladder and the interior of the cover, having means extending from its outer surface into said inflation opening of the cover, said disc being adhesively secured in position against the inner surface of the cover, and the bladder having an inflation inlet accessible through said means that extends into the cover inflation opening, and said disc and said bladder being connected together, whereby said means insures registry of the bladder inlet and cover opening.

4. In an inflatable ball comprising a cover with an inflation opening therein and a bladder, a soft elastic cushion member secured to the interior wall of the cover solely by adhesive and having an integral soft cushioning hollow neck extending into the cover opening to reinforce its adhesive connection to the cover against strains tending to laterally displace the cushion member, said bladder having an inflation inlet accessible through said hollow neck and being attached to said cushion member whereby said neck insures registry of the inflation inlet of the bladder with the cover inflation opening.

WILLIAM A. SONNETT.